(12) United States Patent
Amanullah

(10) Patent No.: US 7,822,163 B2
(45) Date of Patent: Oct. 26, 2010

(54) FRAME SYNCHRONIZATION USING ACCUMULATED SUMMATION

(75) Inventor: Abu S. Amanullah, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 857 days.

(21) Appl. No.: 11/621,706

(22) Filed: Jan. 10, 2007

(65) Prior Publication Data

US 2008/0165909 A1    Jul. 10, 2008

(51) Int. Cl.
*H04L 7/00* (2006.01)
(52) U.S. Cl. ........................ 375/365; 375/354
(58) Field of Classification Search ............... 375/354, 375/365, 362
See application file for complete search history.

(56) References Cited

U.S. PATENT DOCUMENTS

| | | | |
|---|---|---|---|
| 7,031,274 B2 | 4/2006 | Sherman | |
| 2005/0078598 A1 | 4/2005 | Batra et al. | |
| 2006/0007986 A1* | 1/2006 | Larsson | 375/130 |
| 2006/0215774 A1 | 9/2006 | Shor | |
| 2006/0239181 A1 | 10/2006 | Hosur | |
| 2007/0081532 A1* | 4/2007 | Kim et al. | 370/389 |
| 2007/0164857 A1* | 7/2007 | Odenwald et al. | 340/539.22 |
| 2008/0291847 A1* | 11/2008 | Zheng | 370/255 |

OTHER PUBLICATIONS

Shi, K., "High Performance Signal Acquisition Algorithms for Wireless Communications Receivers," Dissertation submitted to Texas A&M Univ., Aug. 2005 (retrieved from the internet: <URL: http://txspace.tamu.edu/bitstreat/handle/1969.1/4365/etd-tamu-2005B-ELEN.

* cited by examiner

*Primary Examiner*—David C Payne
*Assistant Examiner*—Brian J Stevens
(74) *Attorney, Agent, or Firm*—Sheppard Mullin Richter & Hampton LLP

(57) ABSTRACT

A technique for synchronizing a device for communication is based on an accumulated sum of values or absolute values. The absolute value can be of either the sum or difference of a plurality of symbols. In one embodiment, the absolute values of the sum or difference of three symbol pairs are accumulated, and the accumulated total compared to a threshold value to determine whether the symbols are at the end of a predetermined sequence of symbols. When the comparison to the threshold value is positive, the three symbol pairs are the last six symbols in the predetermined sequence. In practice, the invention can be implemented in a number of different environments including, for example, in a WiMedia MBOA network environment. In the WiMedia MBOA environment, the predetermined sequence can comprise the preamble of a WiMedia MBOA packet.

29 Claims, 7 Drawing Sheets

FRAME SYNCHRONIZATION USING ACCUMULATED SUMMATION

TECHNICAL FIELD

The present invention relates to communications systems and methods, and more particularly, some embodiments relate to synchronization of network devices.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks.

Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel.

Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is a technology that enables multiple devices to transmit their signals simultaneously over a communication channel in a wired or wireless setting. The devices respective signals travel within their designated frequency band (carrier), onto which the data (text, voice, video, or other data) is modulated. With adequate separation in frequency band spacing, multiple devices can simultaneously communicate across the same communication channel (network or point-to-point).

Orthogonal FDM (OFDM) spread spectrum systems distribute the data over a plurality of carriers that are spaced apart at precise frequencies. The spacing is chosen so as to provide orthogonality among the carriers. Thus, a receiver's demodulator recovers the modulated data with little interference from the other carrier signals. The benefits of OFDM are high spectral efficiency, resiliency to RF interference, and lower multi-path distortion or inter symbol interference (ISI). OFDM systems can be combined with other techniques (such as time-division multiplexing) to allow sharing of the individual carriers by multiple devices as well, thus adding another dimension of multiplexing capability.

With various communication schemes, synchronization can be an important element to enable productive use of the communication channel. For example, synchronization can be used by a receiving device to determine which portion of a communication it is receiving. As a more detailed example, frame synchronization can be used to enable a receiving device to deter mine the beginning and end of a frame, or portions of the frame.

For WiMedia devices, a frame synchronization algorithm can be used for synchronization within the preamble of a WiMedia MBOA packet. In other words, frame synchronization can be used to determine which portion of the Physical Layer Convergence Protocol (PLCP) preamble the receiver is currently looking at. This is a useful tool as it is possible to detect a packet after receiving a section, for instance, in the middle of the preamble. In this case the position of the channel estimation sequence and subsequent header of the packet cannot be inferred by simply counting the symbol number since the base time domain sequence used in the packet/frame synchronization sequence of the preamble is identical for all the symbols. However, the cover sequence that is used to modulate the base time domain sequence can be used to identify the location within the preamble.

One algorithm for determining frame synchronization can be termed Correlation With a Differential Correlation Sequence. The estimation Metric for differential correlation, $M_{dc}$, calculated for this algorithm can be written for Time Frequency Codes (TFC) 1 and 2 as follows:

$$M_{dc} = \left| \sum_{l=0}^{5} \sum_{k=0}^{127} [r(k + N_s(l+m))]conj[r(k + N_s(l+m) + 3N_s)] \atop [s(k + N_s(l+m))]conj[s(k + N_s(l+m) + 3N_s)] \right|$$

$m = 0, 3, 6, 9, 12, 15, 18.$

Where s(k) is the transmitted cover sequence modulated preamble sequence, r(k) is the received sequence and $N_s$ is the number of samples per symbol.

The differential correlation of the transmitted sequence with a delayed version of itself as well as that for the received sequence is computed. The delay between corresponding samples from the same band in Time Frequency Codes 1 and 2 is $3N_s$ samples and this delay is used in the differential correlation. Index l covers correlation over 6 symbols and index k covers 128 samples in each symbol (excluding 37 zero suffix samples). Index m takes values in $\{0, 3, \ldots 18\}$ and denotes the fact that the three symbol grouping is known due to the hopping pattern.

For Time Frequency Codes 3 and 4, the estimation metric for differential correlation, $M_{dc}$, can be calculated by the following:

$$M_{dc} = \left| \sum_{l=0}^{5} \sum_{k=0}^{127} [r(k + N_s(l+m))]conj[r(k + N_s(l+m) + 6N_s)] \atop [s(k + N_s(l+m))]conj[s(k + N_s(l+m) + 6N_s)] \right|$$

$m = 0, 6, 12, 18.$

Here also the correlation is over 6 symbols, however the corresponding symbols used in the differential correlation are 6 symbols apart. This ensures that the corresponding symbols in the correlation are from the same band. However, in this case 6 symbols need to be stored.

For Time Frequency Codes 5, 6, and 7, the estimation metric for differential correlation, $M_{dc}$, can be calculated by the following:

$$M_{dc} = \left| \begin{array}{c} \sum_{l=0}^{5} \sum_{k=0}^{127} [r(k+N_s(l+m))]conj[r(k+N_s(l+m)+N_s)] \\ [s(k+N_s(l+m))]conj[s(k+N_s(l+m)+N_s)] \end{array} \right|$$

$m = 0, 1, 2, 3, 4, \ldots$

Index l covers correlation over 6 symbols and index k covers 128 samples in each symbol. For Time Frequency Codes 5, 6, and 7 fixed frequency interleaving is used and hence a grouping of 3 or 6 symbols and position within the grouping cannot be specified. Hence index m can take any values in $\{0, 1, \ldots 18\}$. The delay between corresponding samples in the correlation is $N_s$ samples.

BRIEF SUMMARY OF EMBODIMENTS OF THE INVENTION

According to one embodiment of the invention synchronization of a network device can be accomplished by: calculating a first value based on a first plurality of symbols in a predetermined sequence of symbols; calculating a second value based on a second plurality of symbols in the predetermined sequence of symbols; determining a total of the first and second values; and comparing the total to a threshold value to determine a location of the symbols in the predetermined sequence of symbols. According to a further embodiment, the process can further include calculating a third value based on a third plurality of symbols in the predetermined sequence of symbols, wherein the step of determining a total comprises determining a total of the first, second and third values.

In one embodiment, the first, second and third values are calculated as the absolute value of the sum or difference of the first, second and third plurality of symbols, respectively. The first, second and third plurality of symbols can each comprise a pair of symbols, and the second symbol in the pair can be a third symbol from the first symbol in the pair. Alternatively, the second symbol in the pair is adjacent the first symbol in the pair. Other alternatives are permissible. Preferably, the threshold value comprises zero or two, although other thresholds are possible.

In one embodiment, the invention can be implemented to determine an estimation metric for the sum of the absolute, $M_{sa}$, wherein $$M_{sa} = \sum_{l=0}^{2} \sum_{k=0}^{127} |r(k+N_s(l+m)) \pm r(k+N_s(l+m)+3N_s)|;$$

$m = 0, 3, 6, 9, 12, 15, 18, 21$ and further wherein r(k) is the predetermined sequence, and each pair of symbols comprises two symbols that are three symbols apart.

Alternatively, the invention can be implemented to determine an estimation metric for the sum of the absolutes, $M_{sa}$, wherein $$M_{sa} = \sum_{l=0}^{2} \sum_{k=0}^{127} |r(k+N_s(2l+m)) \pm r(k+N_s(2l+m)+N_s)|$$

$m = 0, 6, 12, 18$ and further wherein r(k) is the predetermined sequence, and each pair of symbols comprises two adjacent symbols.

As a further alternative, the invention can be implemented to determine an estimation metric for the sum of the absolutes, $M_{sa}$, wherein $$M_{sa} = \sum_{l=0}^{2} \sum_{k=0}^{127} |r(k+N_s(l+m)) \pm r(k+N_s(l+m)+3N_s)|;$$

$m = 0, 1, 2, \ldots$ and further wherein r(k) is the predetermined sequence, and each pair of symbols comprises two symbols that are three symbols apart.

In accordance with yet another embodiment of the invention, a network device includes one or more modules, made up of hardware, software, or a combination of both, where the modules are configured to: calculate a first value based on a first plurality of symbols in a predetermined sequence of symbols; calculate a second value based on a second plurality of symbols in the predetermined sequence of symbols; determine a total of the first and second values; and to compare the total to a threshold value to determine a location of the symbols in the predetermined sequence of symbols. In one embodiment of the network device, the first, second and third values are calculated as the absolute value of the sum or difference of the first, second and third plurality of symbols, respectively.

In a further embodiment of the network device, the first, second and third plurality of symbols each comprise a pair of symbols, and the second symbol in the pair is three symbols away from the first symbol in the pair. As one alternative, the first, second and third plurality of symbols each comprise a pair of symbols, and wherein the second symbol in the pair is adjacent the first symbol in the pair. Preferably, the threshold value comprises zero or two, although other thresholds are possible.

In one embodiment, the modules determine an estimation metric for the sum of the absolutes, $M_{sa}$, wherein $$M_{sa} = \sum_{l=0}^{2} \sum_{k=0}^{127} |r(k+N_s(l+m)) \pm r(k+N_s(l+m)+3N_s)|;$$

$m = 0, 3, 6, 9, 12, 15, 18, 21$ and further wherein r(k) is the predetermined sequence, and each pair of symbols comprises two symbols that are three symbols apart.

In another embodiment, the modules determine an estimation metric for the sum of the absolutes, $M_{sa}$, wherein $$M_{sa} = \sum_{l=0}^{2} \sum_{k=0}^{127} |r(k+N_s(2l+m)) \pm r(k+N_s(2l+m)+N_s)|$$

-continued $$m = 0, 6, 12, 18$$

and further wherein r(k) is the predetermined sequence, and each pair of symbols comprises two adjacent symbols.

In yet another embodiment, the modules determine an estimation metric for the sum of the absolutes, $M_{sa}$, wherein $$M_{sa} = \sum_{l=0}^{2} \sum_{k=0}^{127} |r(k + N_s(l + m)) \pm r(k + N_s(l + m) + 3N_s)|;$$

$$m = 0, 1, 2, \ldots$$

and further wherein r(k) is the predetermined sequence, and each pair of symbols comprises two symbols that are three symbols apart.

In accordance with yet another embodiment of the invention, a method of synchronization of a network device is provided that includes calculating a value as a sum or difference of a plurality of symbols in a predetermined sequence of symbols, and comparing the calculated value to a threshold value to determine a location of the symbols in the predetermined sequence of symbols. The value calculated can be a sum of absolutes. The value calculated could also be the absolute value of the sum or difference of a pair of symbols in the predetermined sequence of symbols, wherein the second symbol in the pair is three symbols away from the first symbol in the pair or wherein the second symbol in the pair is adjacent the first symbol in the pair.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for synchronizing a communication device. In one embodiment, the present invention is directed toward a system and method for allowing a receive device to determine a location in a block, frame or other plurality of data elements. In another embodiment, a mechanism is presented for allowing a network device to determine a location in a preamble of a WiMedia MBOA data packet.

Before describing the invention in detail, it is useful to describe an example environment with which the invention can be implemented. One such example is a wireless network in which multiple electronic devices (for example, computers and computing devices, cellular telephones, personal digital assistants, motion and still cameras, among others) can communicate and share data, content and other information with one another. One example of such a network is that specified by the WiMedia standard (within WiMedia and Multi-Band OFDM Alliance). From time to time, the present invention is described herein in terms of a distributed network or in terms of a WiMedia standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a distributed wireless network, nor is it limited to a WiMedia standard described as one implementation of the example environment.

Most network standards specify policies or rules that govern the behavior of network connected devices. The WiMedia standard specifies the mechanism and policies that are to be followed by W-USB and WiNet compliant devices in order to allow for an ad hoc and distributed network of such devices to operate efficiently.

Figure 1:
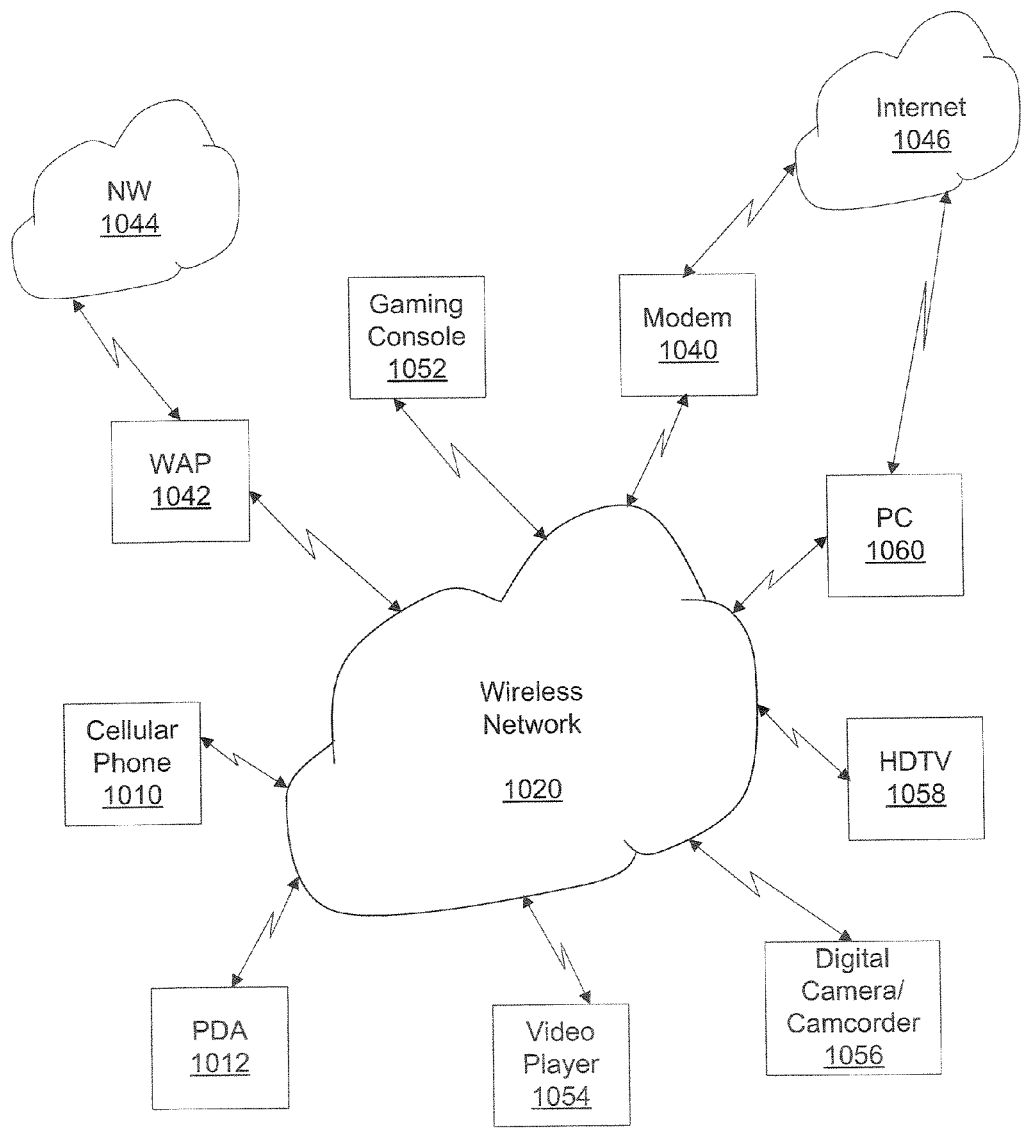
FIG. 1 is a diagram illustrating one possible configuration of a wireless network that can serve as an example environment in which the present invention can be implemented.

FIG. 1 is a block diagram illustrating one possible configuration of a wireless network that can serve as an example environment in which the present invention can be implemented. Referring now to FIG. 1, a wireless network 1020 is provided to allow a plurality of electronic devices to communicate with one another without the need for wires or cables between the devices. A wireless network 1020 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 1020 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 1020 includes a communication device to allow it to communicate with external networks. More particularly, in the illustrated example, wireless network 1020 includes a modem 1040 to provide connectivity to an external network such as the Internet 1046, and a wireless access point 1042 that can provide external connectivity to another network 1044.

Also illustrated in the example wireless network 1020 are portable electronic devices such as a cellular telephone 1010 and a personal digital assistant (PDA) 1012. Like the other electronic devices illustrated in FIG. 1, cellular telephone 1010 and PDA 1012 can communicate with wireless network 1020 via the appropriate wireless interface. Additionally, these devices may be configured to further communicate with an external network. For example, cellular telephone 1010 is typically configured to communicate with a wide area wireless network by way of a base station.

Additionally, the example environment illustrated in FIG. 1 also includes examples of home entertainment devices connected to wireless network 1020. In the illustrated example, electronic devices such as a gaming console 1052, a video player 1054, a digital camera/camcorder 1056, and a high definition television 1058 are illustrated as being interconnected via wireless network 1020. For example, a digital camera or camcorder 1056 can be utilized by a user to capture one or more still picture or motion video images. The captured images can be stored in a local memory or storage device associated with digital camera or camcorder 1056 and ultimately communicated to another electronic device via wireless network 1020. For example, the user may wish to provide a digital video stream to a high definition television set 1058 associated with wireless network 1020. As another example, the user may wish to upload one or more images from digital camera 1056 to his or her personal computer 1060 or to the Internet 1046. This can be accomplished by wireless network 1020. Of course, wireless network 1020 can be utilized to provide data, content, and other information sharing on a peer-to-peer or other basis, as the provided examples serve to illustrate.

Also illustrated is a personal computer 1060 or other computing device connected to wireless network 1020 via a wireless air interface. As depicted in the illustrated example, personal computer 1060 can also provide connectivity to an external network such as the Internet 1046.

In the illustrated example, wireless network 1020 is implemented so as to provide wireless connectivity to the various electronic devices associated therewith. Wireless network 1020 allows these devices to share data, content, and other information with one another across wireless network 1020. Typically, in such an environment, the electronic devices would have the appropriate transmitter, receiver, or transceiver to allow communication via the air interface with other devices associated with wireless network 1020. These electronic devices may conform to one or more appropriate wireless standards and, in fact, multiple standards may be in play within a given neighborhood. Electronic devices associated with the network typically also have control logic or modules configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 1020 are sometimes referred to herein as network devices, members or member devices of the network or devices associated with the network. In one embodiment devices that communicate with a given network may be members or merely in communication with the network.

Some communication networks are divided into periods or frames that can be used for communication and other activities. For example, as discussed above, some networks have a scheduling window such as, for example, a beacon period, for scheduling upcoming communication activities. Also, some networks have a communication window during which such communication activities take place. In the WiMedia-MBOA standard, the bandwidth is divided into superframes, which in turn are divided into time slots for the transmission and reception of data by the various electronic devices associated with the network.

Figure 2:
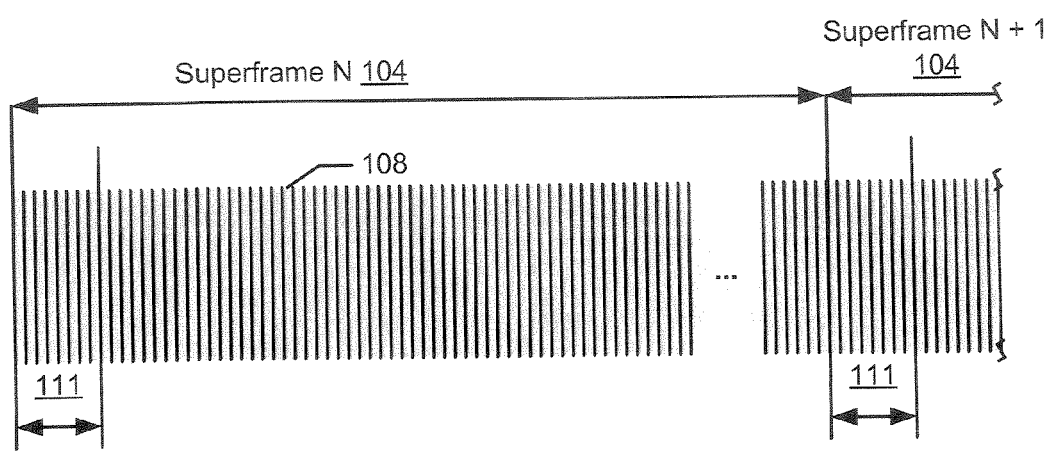
FIG. 2 is an example time slots in the example environment in which the present invention can be implemented.

An example of such time slots are illustrated in FIG. 2. Referring now to FIG. 2, in this exemplary environment, the communication bandwidth is divided into superframes 104 (two illustrated), each superframe 104 itself being divided into a plurality of timeslots referred to as Media Access Slots 108. In the example environment, there are 256 media access slots 108 in each superframe 104, although other allocations are possible. Additionally, at the beginning of each superframe 104 is a beacon period 111, which is comprised of a plurality of beaconing slots. In some networks, the beacon period 111 is a period during which devices reserve timeslots and exchange other housekeeping or status information. For example, in the WiMedia-MBOA distributed wireless network, the superframes comprise a beacon period 111, during which devices are awake and receive beacons from other devices. Superframes in the above-referenced standard, and other time periods used for communications among devices in other network configurations, with or without scheduling windows, are generally referred to herein as communication windows.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

In the example environment, a preamble is included with the WiMedia MBOA frame. The WiMedia MBOA preamble comprises 24 symbols, having 165 samples each. The base time domain sequence in the preamble is modulated with a cover sequence that can be used in determining the location within the preamble. Table 1 lists the cover sequence used for the standard preamble for the different Time Frequency Codes (TF Codes) as specified in the WiMedia MBOA Standard. The cover sequence is used in one embodiment to enable the detection of the end of the preamble sequence and beginning of the channel estimation sequence.

TABLE 1

Cover sequence for standard preamble

| m | $s_{cover}[m]$ for TF codes 1, 2 | $s_{cover}[m]$ for TF codes 3, 4 | $s_{cover}[m]$ for TF codes 5, 6, 7 |
|---|---|---|---|
| 0 | 1 | 1 | −1 |
| 1 | 1 | 1 | −1 |
| 2 | 1 | 1 | −1 |
| 3 | 1 | 1 | −1 |
| 4 | 1 | 1 | −1 |
| 5 | 1 | 1 | −1 |
| 6 | 1 | 1 | −1 |
| 7 | 1 | 1 | 1 |
| 8 | 1 | 1 | −1 |
| 9 | 1 | 1 | −1 |
| 10 | 1 | 1 | 1 |
| 11 | 1 | 1 | −1 |
| 12 | 1 | 1 | −1 |
| 13 | 1 | 1 | 1 |
| 14 | 1 | 1 | −1 |
| 15 | 1 | 1 | −1 |
| 16 | 1 | 1 | 1 |
| 17 | 1 | 1 | −1 |
| 18 | 1 | 1 | −1 |
| 19 | 1 | −1 | 1 |
| 20 | 1 | 1 | −1 |
| 21 | −1 | −1 | 1 |
| 22 | −1 | 1 | 1 |
| 23 | −1 | −1 | 1 |

In one embodiment of the invention, a synchronization algorithm is provided based on an accumulated sum or difference of values, or absolute values. In various embodiments, the absolute or the magnitude can be of either the sum or the difference of the received samples and a delayed version.

Figure 3:
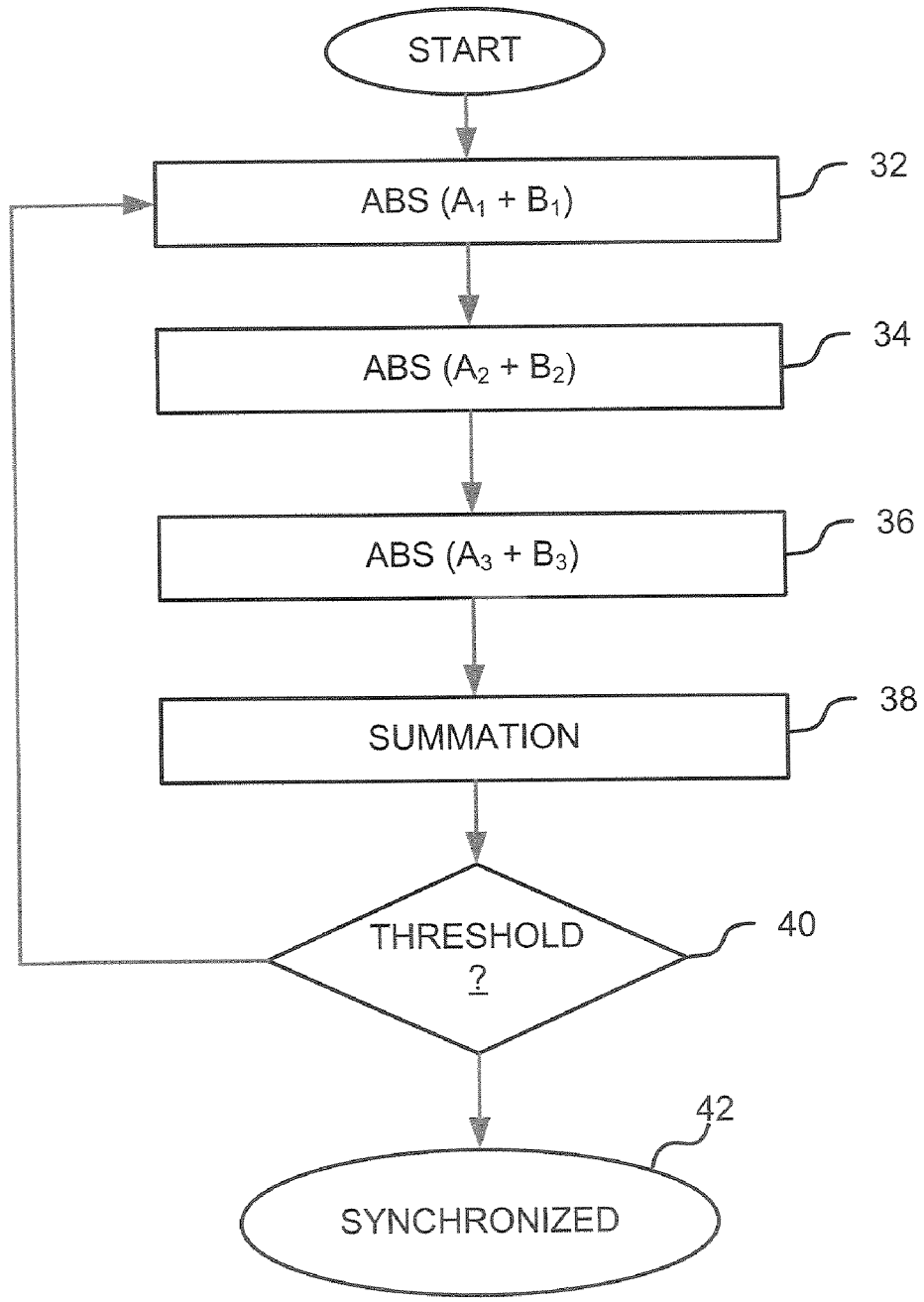
FIG. 3 is a diagram illustrating a process for determining a location of symbols in a predetermined sequence of symbols in accordance with one embodiment of the invention.

FIG. 3 is a diagram illustrating an example embodiment, wherein the total of the absolute value sums of sequence pairs is used to synchronize the preamble in accordance with one embodiment of the invention. Referring now to FIG. 3, in a step 32, the absolute value of the sum of $A_1$ and $B_1$ is determined. In one embodiment, $B_1$ occurs three symbol periods later than $A_1$. In embodiments where each symbol includes 165 samples, as in the WiMedia MBOA preamble, $B_1$ occurs 495 samples after $A_1$.

In a step 34, the absolute value of the sum of $A_2$ and $B_2$ is determined. In one embodiment, $B_2$ occurs three symbol periods later than $A_2$. In embodiments where each symbol includes 165 samples, as in the WiMedia MBOA preamble, $B_2$ occurs 495 samples after $A_2$.

In a step 36, the absolute value of the sum of $A_3$ and $B_3$ is determined. In one embodiment, $B_3$ occurs three symbol periods later than $A_3$. In embodiments where each symbol includes 165 samples, as in the WiMedia MBOA preamble, $B_3$ occurs 495 samples after $A_3$.

In a step 38, the total of the above calculated sums is computed. This total can be computed at the end of step 38, or a running total can be maintained. In a step 40, the total is evaluated to determine whether the end of the preamble has been reached. If the end has been reached, synchronization is complete as illustrated by step 42. If, on the other hand, the end of the preamble has not been reached, the process continues at step 32 and, in one embodiment, repeats until the end is reached.

For example, for Time Frequency Codes 1, 2, the sum computed at step 38 will go to a minimum for the situation where: $A_1$ and $B_1$ are symbols 18 and 21 in the preamble, respectively; $A_2$ and $B_2$ are symbols 19 and 22 in the preamble, respectively; and A3 and B3 are symbols 20 and 23 in the preamble. For example, looking at just the cover codes, the sum computed at step 38 would actually be Zero (0) for the cover code symbols themselves. Because in one embodiment the cover codes actually modulate the preamble sequence, and also due to noise or other impairments (for example, frequency offset) that may be present, the actual computed sum might not itself go to zero. Instead, a threshold value can be established below which, the end of the sequence can be identified.

Figure 4:
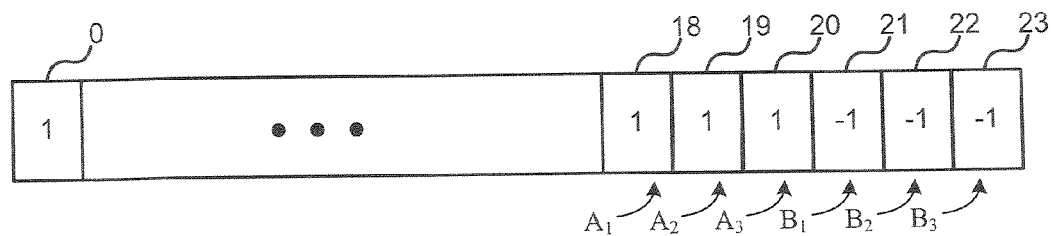
FIG. 4 is a diagram illustrating sequence pairs for Time Frequency Codes 1 and 2 in accordance with one embodiment of the invention.

An example of this is for Time Frequency Codes 1 and 2 is illustrated in FIG. 4, where it can be seen that for this scenario, over symbols 18-23, the total of the absolute values of the sums of the cover code values $A_X$ and $B_X$ will equal Zero (0), for X from 1-3 (ignoring noise and other impairments)

In one embodiment, the above process for Time Frequency Codes 1 and 2 can be described using an estimation metric. The sum-of-the-absolutes estimation metric, $M_{sa}$, for Time Frequency Codes 1 and 2 is calculated as the following:

$$M_{sa} = \sum_{l=0}^{2} \sum_{k=0}^{127} |r(k + N_s(l + m)) \pm r(k + N_s(l + m) + 3N_s)|;$$

$$m = 0, 3, 6, 9, 12, 15, 18, 21$$

Where r(k) is the received sequence, and corresponding samples from two symbols that are 3 symbols apart are added or subtracted. Index l ranges over 3 symbols and index k covers 128 samples in each symbol (excluding 37 zero suffix samples). The three symbol delay matches the hoping pattern so that the symbols from the same band are used in the summation (or subtractions).

For Time Frequency Codes 3 and 4, in one embodiment a similar process can be followed as was used for Time Frequency Codes 1 and 2. Referring again to FIG. 3, the total of the absolute values of the sums of $A_X$ and $B_X$ are computed for X from 1-3. In one embodiment, however, to determine synchronization for Time Frequency Codes 3 and 4, $A_X$ and $B_X$ are selected as adjacent symbols. For example, in embodiments where each symbol includes 165 samples, as in the WiMedia MBOA preamble, $B_X$ occurs 165 samples after $A_X$.

Figure 5:
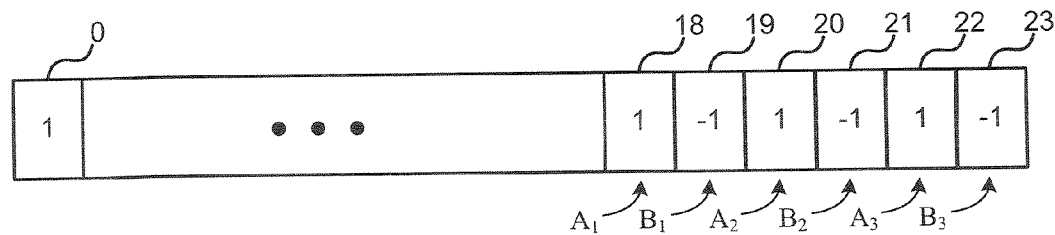
FIG. 5 is a diagram illustrating sequence pairs for Time Frequency Codes 3 and 4 in accordance with one embodiment of the invention.

For example, for Time Frequency Codes 3 and 4, the sum computed at step 38 will go to a minimum for the situation where: $A_1$ and $B_1$ are symbols 18 and 19 in the preamble, respectively; $A_2$ and $B_2$ are symbols 20 and 21 in the preamble, respectively; and $A_3$ and $B_3$ are symbols 22 and 23 in the preamble. As such, in this example, when the computed sum attains a minimum value (which might be determined by evaluating the value against an established threshold), the end of the preamble is reached. An example of this is for Time Frequency Codes 3 and 4 is illustrated in FIG. 5, where it can be seen that for this scenario, over symbols 18-23, the total of the absolute values of the sums of the cover code values $A_X$ and $B_X$ will equal Zero (0), for X from 1-3 (ignoring noise and other impairments).

The sum-of-the-absolutes estimation metric, $M_{sa}$, for Time Frequency Codes 3 and 4 can be calculated by the following:

$$M_{sa} = \sum_{l=0}^{2} \sum_{k=0}^{127} |r(k + N_s(2l + m)) \pm r(k + N_s(2l + m) + N_s)|$$

-continued $$m = 0, 6, 12, 18$$

Thus, in one embodiment For Time Frequency Codes 3 and 4, the hopping pattern repeats over 6 symbols. However, in the given metric computation, a delay of $N_s$ samples (1 symbol) is used between corresponding samples. This can reduce memory requirements but might also force the use of alternate symbols because every other symbol in the summation is from a different band.

For Time Frequency Codes 5 and 6, in one embodiment a similar process can be followed as was described above for Time Frequency Codes 1 and 2 and for Time Frequency Codes 3 and 4. Referring again to FIG. 3, the total of the absolute values of the sums of $A_X$ and $B_X$ are computed for X from 1-3. In one embodiment, however, to deter mine synchronization for Time Frequency Codes 5, 6 and 7, $A_X$ and $B_X$ are selected as they were for Time Frequency Codes 1 and 2. That is, for Time Frequency Codes 5, 6 and 7, and $B_X$ is selected as the third symbol after $A_X$. For example, in embodiments where each symbol includes 165 samples, as in the WiMedia MBOA preamble, $B_X$ occurs 495 samples after $A_X$.

Figure 6:
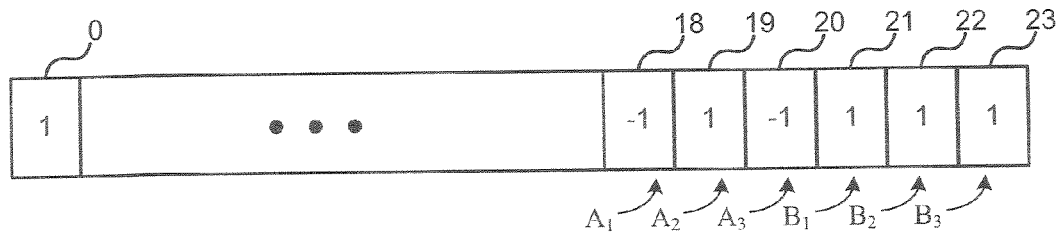
FIG. 6 is a diagram illustrating sequence pairs for Time Frequency Codes 4, 5 and 6 in accordance with one embodiment of the invention.

Likewise, for Time Frequency Codes 5, 6 and 7 in the example environment, the sum computed at step 38 will go to a minimum value at the end of the preamble. As can be seen, the value for the cover codes themselves would go to Two (2) for the situation where: $A_1$ and $B_1$ are symbols 18 and 21 in the preamble, respectively; $A_2$ and $B_2$ are symbols 19 and 22 in the preamble, respectively; and $A_3$ and $B_3$ are symbols 20 and 23 in the preamble. In every other case stepping through the preamble, the total calculated at step 38 would be based on the cover code values that would result in a value of 6 or 4 (ignoring noise and other information). As such, in this example, when the computed sum falls below a predetermined threshold, the end of the preamble is reached. An example of this is for Time Frequency Codes 4, 5 and 6 is illustrated in FIG. 6, where it can be seen that for this scenario, over symbols 18-23, the total of the absolute values of the sums of the cover code values $A_X$ and $B_X$ will equal Two (2), for X from 1-3 (ignoring noise and other impairments).

For Time Frequency Codes 5, 6 and 7 no band hopping takes place and the sum-of-the-absolutes estimation metric, $M_{sa}$, is calculated from:

$$M_{sa} = \sum_{l=0}^{2} \sum_{k=0}^{127} |r(k + N_s(l+m)) \pm r(k + N_s(l+m) + 3N_s)|;$$

$$m = 0, 1, 2, \ldots$$

In each of the above algorithms the estimation metric can be compared to a threshold and on crossing the threshold frame synchronization is declared. This threshold should be robust enough to work over the range of signal-to-noise ratios that the receiver is supposed to operate. In addition, the threshold should hold even though different gain is applied to different symbols of the preamble due to automatic gain control adjustments taking several symbols. A fixed threshold may satisfy these requirements. In alternative embodiments, an adaptive threshold might be used.

As can be seen from the above description with reference to FIGS. 3 through 6, $A_1$-$A_3$ and $B_1$-$B_3$ can be selected as a contiguous block of preamble symbols, although other configurations may be possible based on the cover sequence implemented. Particularly, for Time Frequency Codes 1 and 2 and for Time Frequency Codes 5, 6 and 7, the contiguous symbols are, in order, $A_1$, $A_2$, $A_3$, $B_1$, $B_2$, and $B_3$. For Time Frequency Codes 3 and 4 the contiguous symbols are, in order, $A_1$, $B_1$, $A_2$, $B_2$, $A_3$, and $B_3$. In one embodiment, the computations can be made in real time or near real time as the symbols are received. In an alternative embodiment, the computations can be made on a post-processing basis.

The invention can be implemented such that in one embodiment its computational complexity is less than that of the conventional differential correlation scheme. In the conventional differential correlation scheme (described in the Related Art Section of this Patent Specification), a sequence consisting of the product of received sample and a delayed sample is matched with the expected sequence based on the transmitted preamble sequence. Hence one complex multiplication, two real multiplications and one complex addition per sample are required to be performed. In addition, if an adaptive threshold is used, a magnitude of a complex number and a real addition per sample is required. After summing 6*128=768 samples, a further magnitude computation and scaling is performed. This is performed for every value of the shift value m until the threshold is crossed. The expected product sequence can be pre-computed and stored in the memory.

For embodiments using the sum of the absolutes, the magnitude of a sum of two complex numbers is taken and this magnitude is accumulated over three samples. For example, in the WiMedia MBOA standard, each symbol has 165 samples, but only uses 128. Therefore, the magnitude is accumulated over 3*128=384 samples. Hence, one complex addition, one magnitude computation and one real addition can be used per sample. As mentioned in the last section, a fixed threshold performs well for sum of absolute algorithm, and hence the additional computation for adaptive threshold can be avoided in this case. Table 2 gives a comparison of the number of operations per sample required for differential correlation and one embodiment of the sum of absolute algorithm. The table does not include the processing required per symbol grouping basis.

TABLE 2

| Computational Complexity | | |
|---|---|---|
| | Number of operations (per sample) required in differential correlation algorithm | Number of operations (per sample) required in sum of absolute algorithm |
| Complex Multiplications | 1 | |
| Complex Additions | 1 | 1 |
| Magnitude of Complex Number | 1 + 1/768 | 1 |
| Real Multiplications | 2 + 2/768 | |
| Real Additions | 1 | 1 |

It can be seen from Table 2 that the sum of absolute algorithm can be implemented such that no multiplication is required. This can net a substantial savings over the conventional differential correlation algorithm. For example, in Time Frequency Code 5, as many as 768*6*12=55296 real multiplications may be required per packet. This assumes that the first 6 symbols of the preamble are used for packet detection and symbol synchronization.

As used herein, the term module is used to describe a given unit of functionality that can be performed in accordance with one or more embodiments of the present invention. As used herein, a module can be implemented utilizing any form of hardware, software, or a combination thereof. In implementation, the various modules described herein can be implemented as discrete modules or the functions and features described can be shared in part or in total among one or more modules. In other words, as would be apparent to one of ordinary skill in the art after reading this description, the various features and functionality described herein may be implemented in any given application can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a processing system capable of carrying out the functionality described with respect thereto. Thus, for example, for network devices, one or more processors can be used to perform device operations and a different processor can be used to perform the frame synchronization. Alternatively, one or more processors can be shared by one or more device operations and frame synchronization operations.

Figure 7:
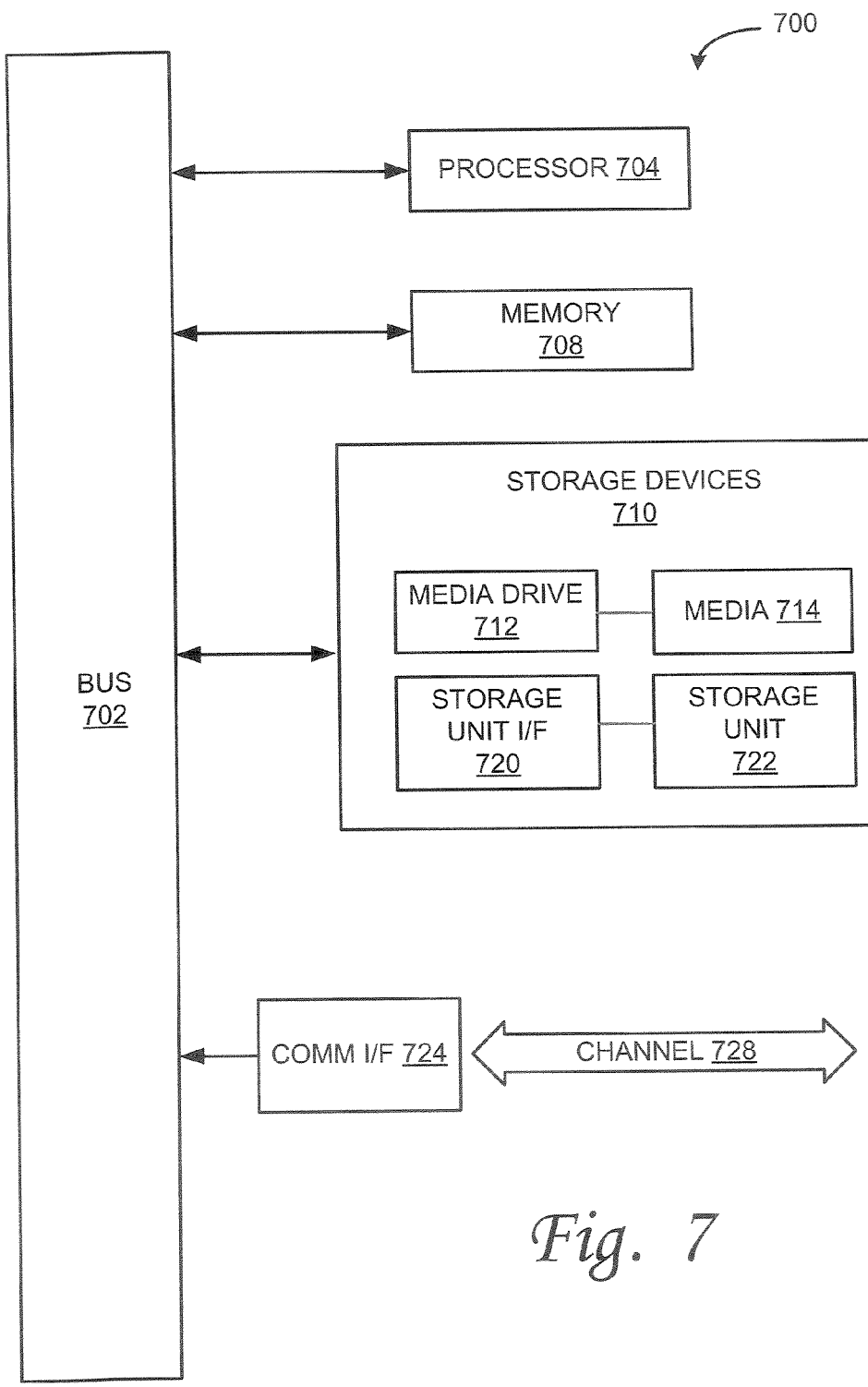
FIG. 7 is a diagram illustrating an example of a network device implemented as a processor-based device in accordance with one embodiment of the invention.

One example of a processing system that can be implemented to perform device operations and frame synchronization is shown in FIG. 7. Various embodiments are described in terms of this example processing system 700. After reading this description, it will become apparent to a person skilled in the relevant art how to implement the invention using other processing systems or architectures, or other control logic or modules.

Referring now to FIG. 7, processing system 700 may represent, for example, desktop, laptop and notebook computers; hand-held computing devices (PDA's, smart phones, cell phones, palmtops, etc.); computers, workstations or servers; network devices such as those illustrated in FIG. 1, or any other type of special or general purpose processing devices as may be desirable or appropriate for a given application or environment. Processing system 700 can also represent computing capabilities embedded within or otherwise available to a given device. Processing system 700 can include one or more controllers or processors, such as a processor 704. Processor 704 can be implemented using a general-purpose or special-purpose processing engine such as, for example, a microprocessor, controller, or other control logic. In the example illustrated in FIG. 7, processor 704 is connected to a bus 702 or other communication medium to facilitate interaction with other components of processing system 700.

Processing system 700 can also include a main memory 708, preferably random access memory (RAM) or other dynamic memory, for storing information and instructions to be executed by processor 704. Main memory 708 also may be used for storing temporary variables or other intermediate information during execution of instructions to be executed by processor 704. Processing system 700 can likewise includes a read only memory ("ROM") or other static storage device coupled to bus 702 for storing static information and instructions for processor 704.

The processing system 700 can also include information storage mechanism 710, which can include, for example, a media drive 712 and a storage unit interface 720. The media drive 712 can include a drive or other mechanism to support fixed or removable storage media. For example, a hard disk drive, a floppy disk drive, a magnetic tape drive, an optical disk drive, a CD or DVD drive (R or RW), or other removable or fixed media drive. Storage media 714, can include, for example, a hard disk, a floppy disk, magnetic tape, optical disk, a CD or DVD, or other fixed or removable medium that is read by and written to by media drive 712. As these examples illustrate, the storage media 714 can include a computer usable storage medium having stored therein particular computer software or data.

In alternative embodiments, information storage mechanism 710 may include other similar instrumentalities for allowing computer programs or other instructions or data to be loaded into processing system 700. Such instrumentalities can include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to processing system 700.

Processing system 700 can also include a communications interface 724. Communications interface 724 can be used to allow software and data to be transferred between processing system 700 and external devices. Examples of communications interface 724 can include a modem or softmodem, a network interface (such as an Ethernet, network interface card, or other interface), a communications port (such as for example, a USB port, IR port, RS232 port or other port), or other communications interface. Software and data transferred via communications interface 724 are carried on signals, which can be electronic, electromagnetic, optical or other signals capable of being received by a given communications interface 724. These signals can be provided to communications interface 724 via a channel 728. This channel 728 can carry signals and can be implemented using a wired or wireless medium. Some examples of a channel can include a phone line, a cellular phone link, an RF link, an optical link, a network interface, a local or wide area network, and other communications channels.

Although not illustrated, other interfaces and modules might be provided to facilitate the functionality of the network device. For example, a network communications interface might be provided to allow the network device to operate with other network devices.

In this document, the terms "computer program medium" and "computer usable medium" are used to generally refer to media such as, for example, memory 708, storage unit 720, media 714, and signals on channel 728. These and other various forms of computer usable media may be involved in carrying one or more sequences of one or more instructions to processor 704 for execution. Such instructions, generally referred to as "computer program code" (which may be grouped in the form of computer programs or other groupings), when executed, enable the processing system 700 to perform features or functions of the present invention as discussed herein.

Figure 8:
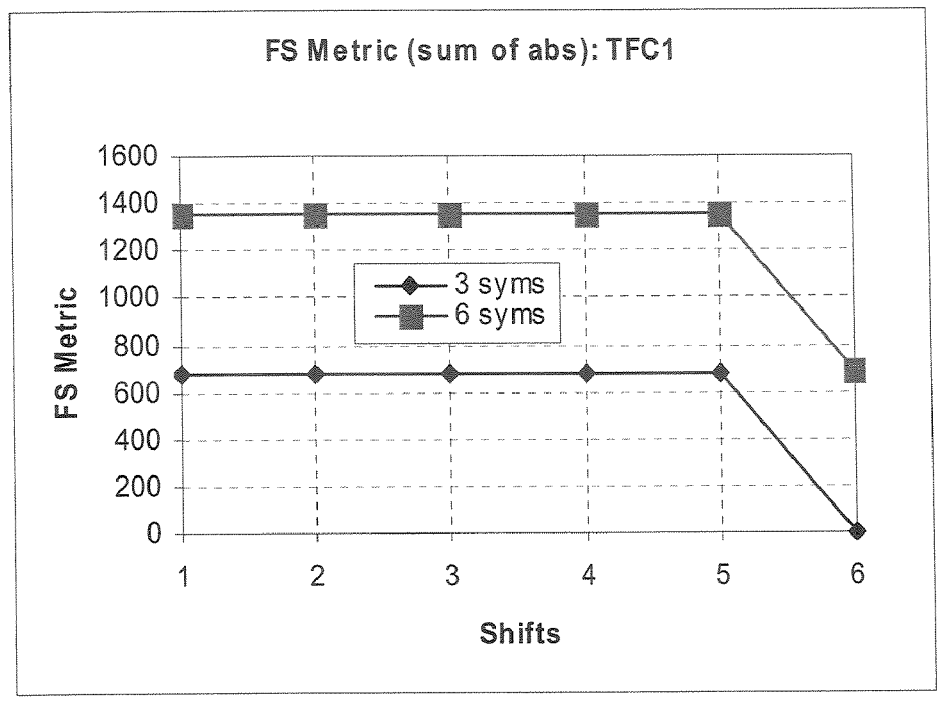
FIG. 8 is a plot of the metric $M_{sa}$ for Time Frequency Code 1 across different symbols in the preamble in accordance with one embodiment of the invention.

Floating and fixed point simulations were performed to illustrate example performance and thereby facilitate threshold identification or selection. For these examples, the MATLAB environment was used to generate plots of the metric $M_{sa}$ calculated for different Time Frequency Codes. FIG. 8 is a plot of the metric $M_{sa}$ for Time Frequency Code 1 across different symbols in the preamble in accordance with one embodiment of the invention. The plot illustrates the metric for both 3 and 6 symbols.

Figure 9:
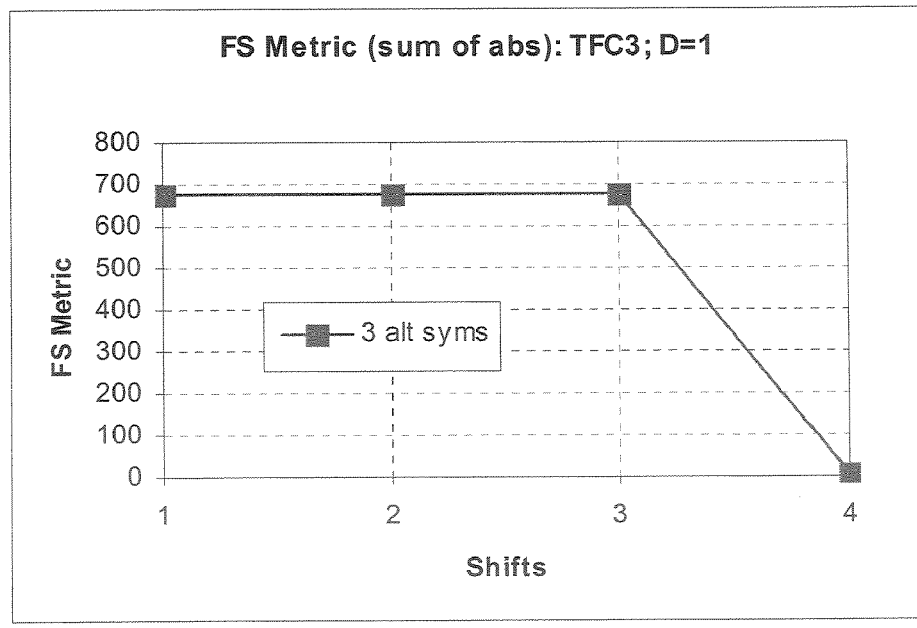
FIG. 9 is a plot of the metric $M_{sa}$ for Time Frequency Code 3, for 3 symbols in accordance with one embodiment of the invention.

FIG. 9 is a plot of the metric $M_{sa}$ for Time Frequency Code 3, for 3 symbols in accordance with one embodiment of the invention. However the symbols are not consecutive, as described above, alternate symbols are taken so that symbols from the same band are added or subtracted.

Figure 10:
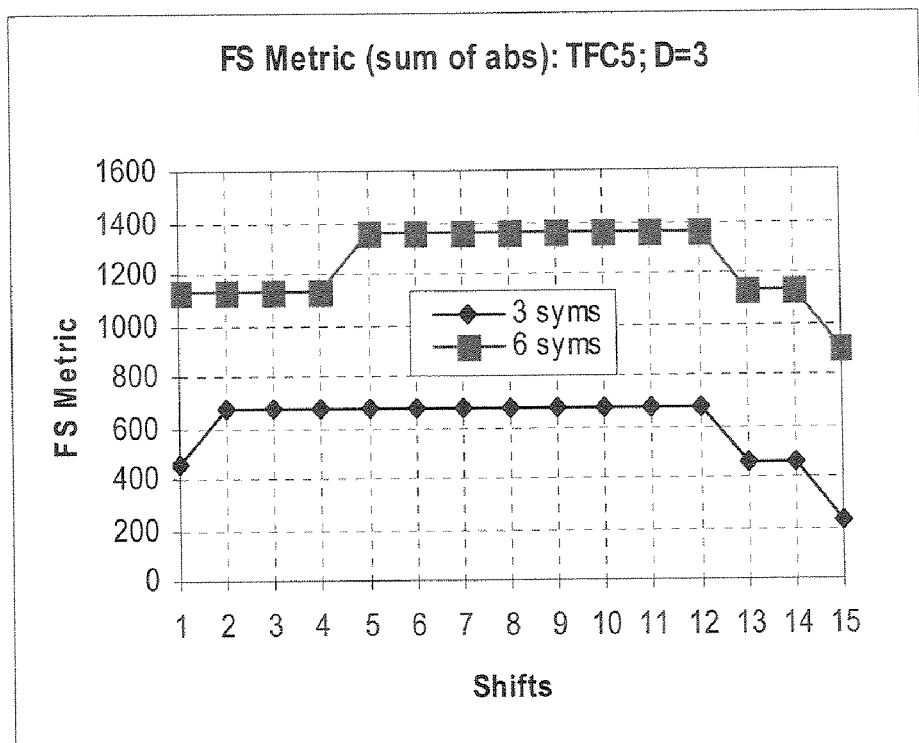
FIG. 10 is a plot of the metric $M_{sa}$ for Time Frequency Code 5 in accordance with one embodiment of the invention. Results for both 3 and 6 symbols are shown.

FIG. 10 is a plot of the metric $M_{sa}$ for Time Frequency Code 5 in accordance with one embodiment of the invention. Results for both 3 and 6 symbols are shown.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of synchronization of performed by a network device, comprising:
    obtaining a sequence of symbols transmitted according to a predetermined cover sequence, wherein a given symbol of the sequence of symbols comprises a number of samples and wherein the sequence of symbols comprises a sequence of samples;
    determining an estimation metric, $M_{sa}$, by comparing pairs of symbols from the sequence of symbols; and
    comparing the estimation metric to a threshold value to determine frame synchronization;
wherein $$M_{sa} = \sum_{l=0}^{l_{max}} \sum_{k=0}^{k_{max}} |r(k + N_s(j \cdot l + m)) \pm r(k + N_s(j \cdot l + m) + n \cdot N_s)|,$$

where r(i) is the ith sample, where $l_{max}$ is determined according to the number of symbol pairs compared, where $k_{max}$ is determined according the number of samples per symbol, where $N_s$ is the number of samples per symbol, and where j, m, and n are determined according to the predetermined cover sequence.

2. The method of claim 1, wherein the steps of determining the estimation metric and comparing the estimation metric to the threshold value are repeated for sequential values of m; and further comprising transmitting a frame synchronization declaration if the estimation metric is less than the threshold value for a given value of m.

3. The method of claim 2, wherein the sequence of symbols is further transmitted according to a predetermined frequency band hopping pattern; and wherein j or n is determined such that the symbols of a given compared pair of symbols are transmitted on the same frequency band.

4. The method of claim 2, wherein n is determined according to the cover sequence such that, if the estimation metric is less than the threshold value, the symbols of at least a predetermined number of the $l_{max}$ compared pairs of symbols are transmitted with different phases.

5. The method of claim 2, wherein $k_{max}$ comprises the number of samples per symbol excluding zero suffix samples.

6. The method of claim 5, wherein $$M_{sa} = \sum_{l=0}^{2} \sum_{k=0}^{127} |r(k + N_s(l+m)) \pm r(k + N_s(l+m) + 3N_s)|, \text{ and}$$

$$m = 0, 3, 6, 9, 12, 15, 18, 21$$

7. The method of claim 5, wherein $$M_{sa} = \sum_{l=0}^{2} \sum_{k=0}^{127} |r(k + N_s(2l+m)) \pm r(k + N_s(2l+m) + N_s)|, \text{ and}$$

$$m = 0, 6, 12, 18$$

8. The method of claim 5, wherein $$M_{sa} = \sum_{l=0}^{2} \sum_{k=0}^{127} |r(k + N_s(l+m)) \pm r(k + N_s(l+m) + 3N_s)|, \text{ and}$$

$$m = 0, 1, 2, \ldots$$

9. The method of claim 1, wherein the sequence of symbols is a preamble of a WiMedia MBOA packet.

10. The method of claim 1, wherein the network device is WiMedia MBOA-compliant network device.

11. A network device, comprising:
a module configured to obtain a sequence of symbols transmitted according to a predetermined cover sequence, wherein a given symbol of the sequence of symbols comprises a number of samples and wherein the sequence of symbols comprises a sequence of samples;
a module configured to determine an estimation metric, $M_{sa}$, by comparing pairs of symbols from the sequence of symbols; and
a module configured to compare the estimation metric to a threshold value to determine frame synchronization; wherein $$M_{sa} = \sum_{l=0}^{l_{max}} \sum_{k=0}^{k_{max}} |r(k + N_s(j \cdot l + m)) \pm r(k + N_s(j \cdot l + m) + n \cdot N_s)|,$$

where r(i) is the ith sample, where $l_{max}$ is determined according to the number of symbol pairs compared, where $k_{max}$ is determined according the number of samples per symbol, where $N_s$ is the number of samples per symbol, and where j, m, and n are determined according to the predetermined cover sequence.

12. The network device of claim 11, wherein the module configured to determine and the module configured to compare are configured to repeat the steps of determining the estimation metric and comparing the estimation metric to the threshold value for sequential values of m; and further comprising a module configured to transmit a frame synchronization declaration if the estimation metric is less than the threshold value for a given value of m.

13. The network device of claim 12, wherein $k_{max}$ comprises the number of samples per symbol excluding zero suffix samples.

14. The network device of claim 12, wherein the sequence of symbols is further transmitted according to a predetermined frequency band hopping pattern; and wherein j or n is determined such that the symbols of a given compared pair of symbols are transmitted on the same frequency band.

15. The network device of claim 12, wherein n is determined according to the cover sequence such that, if the estimation metric is less than the threshold value, the symbols of at least a predetermined number of the $l_{max}$ compared pairs of symbols are transmitted with different phases.

16. The network device of claim 12, wherein $k_{max}$ comprises the number of samples per symbol excluding zero suffix samples.

17. The network device of claim 16, wherein $$M_{sa} = \sum_{l=0}^{2} \sum_{k=0}^{127} |r(k + N_s(l+m)) \pm r(k + N_s(l+m) + 3N_s)|, \text{ and}$$

$$m = 0, 3, 6, 9, 12, 15, 18, 21$$

18. The network device of claim 16, wherein $$M_{sa} = \sum_{l=0}^{2} \sum_{k=0}^{127} |r(k + N_s(2l+m)) \pm r(k + N_s(2l+m) + N_s)|, \text{ and}$$

$$m = 0, 6, 12, 18$$

19. The network device of claim 16, wherein $$M_{sa} = \sum_{l=0}^{2} \sum_{k=0}^{127} |r(k + N_s(l+m)) \pm r(k + N_s(l+m) + 3N_s)|, \text{ and}$$

$$m = 0, 1, 2, \ldots$$

20. The network device of claim 11, wherein the sequence of symbols is a preamble of a WiMedia MBOA packet.

21. The network device of claim 11, wherein the network device is WiMedia MBOA-compliant network device.

22. A storage media having computer readable program code embodied thereon, the computer readable program code configured to cause a network device to perform a method of synchronization of a network device, the method comprising:
obtaining a sequence of symbols transmitted according to a predetermined cover sequence, wherein a given symbol of the sequence of symbols comprises a number of samples and wherein the sequence of symbols comprises a sequence of samples;
determining an estimation metric, $M_{sa}$, by comparing pairs of symbols from the sequence of symbols; and
comparing the estimation metric to a threshold value to determine frame synchronization;
wherein $$M_{sa} = \sum_{l=0}^{l_{max}} \sum_{k=0}^{k_{max}} |r(k + N_s(j \cdot l + m)) \pm r(k + N_s(j \cdot l + m) + n \cdot N_s)|,$$

where r(i) is the ith sample, where $l_{max}$ is determined according to the number of symbol pairs compared, where $k_{max}$ is determined according the number of samples per symbol, where $N_s$ is the number of samples per symbol, and where j, m, and n are determined according to the predetermined cover sequence.

23. The storage media of claim 22, wherein the steps of determining the estimation metric and comparing the estimation metric to the threshold value are repeated for sequential values of m; and further comprising transmitting a frame synchronization declaration if the estimation metric is less than the threshold value for a given value of m.

24. The storage media of claim 23, wherein the sequence of symbols is further transmitted according to a predetermined frequency band hopping pattern; and wherein j or n is determined such that the symbols of a given compared pair of symbols are transmitted on the same frequency band.

25. The storage media of claim 23, wherein n is determined according to the cover sequence such that, if the estimation metric is less than the threshold value, the symbols of at least a predetermined number of the $l_{max}$ compared pairs of symbols are transmitted with different phases.

26. The storage media of claim 23, wherein $k_{max}$ comprises the number of samples per symbol excluding zero suffix samples.

27. The storage media of claim 26, wherein $$M_{sa} = \sum_{l=0}^{2} \sum_{k=0}^{127} |r(k + N_s(l + m)) \pm r(k + N_s(l + m) + 3N_s)|, \text{ and } m =$$

0, 3, 6, 9, 12, 15, 18, 21.

28. The storage media of claim 26, wherein $$M_{sa} = \sum_{l=0}^{2} \sum_{k=0}^{127} |r(k + N_s(2l + m)) \pm r(k + N_s(2l + m) + N_s)|, \text{ and } m =$$

0, 6, 12, 18.

29. The storage media of claim 26, wherein $$M_{sa} = \sum_{l=0}^{2} \sum_{k=0}^{127} |r(k + N_s(l + m)) \pm r(k + N_s(l + m) + 3N_s)|, \text{ and } m =$$

0, 1, 2, ...

* * * * *